(12) United States Patent
Maebashi et al.

(10) Patent No.: US 7,280,778 B2
(45) Date of Patent: Oct. 9, 2007

(54) IMAGE FORMING APPARATUS WITH TRANSFER MATERIAL REGULATING MEMBERS

(75) Inventors: Yoichiro Maebashi, Tokyo (JP); Toshiaki Miyashiro, Sunto-Gun (JP); Yuki Nishizawa, Susono (JP)

(73) Assignee: Canon Kabushiki Kaisha, Tokyo (JP)

( * ) Notice: Subject to any disclaimer, the term of this patent is extended or adjusted under 35 U.S.C. 154(b) by 120 days.

(21) Appl. No.: 11/088,756

(22) Filed: Mar. 25, 2005

(65) Prior Publication Data

US 2005/0219653 A1 Oct. 6, 2005

(30) Foreign Application Priority Data

Mar. 31, 2004 (JP) ............................. 2004-104450

(51) Int. Cl.
*G03G 15/00* (2006.01)

(52) U.S. Cl. ...................................................... 399/49

(58) Field of Classification Search ................. 399/49, 399/73, 74
See application file for complete search history.

(56) References Cited

U.S. PATENT DOCUMENTS

| | | | |
|---|---|---|---|
| 6,961,526 B2 | 11/2005 | Tezuka et al. | |
| 7,122,800 B2* | 10/2006 | Barry et al. | ............. 250/341.1 |
| 2005/0046691 A1 | 3/2005 | Katagiri et al. | |
| 2005/0219653 A1 | 10/2005 | Maebashi et al. | |

FOREIGN PATENT DOCUMENTS

| | | | |
|---|---|---|---|
| JP | 58031354 A | * | 2/1983 |
| JP | 10268589 A | * | 10/1998 |
| JP | 2000132013 A | * | 5/2000 |
| JP | 2003-287934 | | 10/2003 |

OTHER PUBLICATIONS

Computer Translation of cited reference JP2000-132013.*

* cited by examiner

*Primary Examiner*—Quana Grainger
(74) *Attorney, Agent, or Firm*—Fitzpatrick, Cella, Harper & Scinto (57) ABSTRACT

In an image forming apparatus using an optical sensor for detecting light reflection characteristics of a toner image fixed on a transfer material, occurrence of gloss unevenness in a printed image can be prevented. The image forming apparatus includes a first transfer material conveying path for normal printing, a second transfer material conveying path for image density control, a sensor contact member integral with the optical sensor and a transfer material supporting member contacting a transfer material rear surface in a position opposing the sensor contact member. At the time of normal printing, the sensor contact member and the transfer material supporting member are disposed in a spaced position against the transfer material, and at the time of image density control, the sensor contact member or the transfer material supporting member moves so that the sensor contact member and the transfer material supporting member contact the transfer material.

10 Claims, 8 Drawing Sheets

IMAGE FORMING APPARATUS WITH TRANSFER MATERIAL REGULATING MEMBERS

BACKGROUND OF THE INVENTION

1. Field of the Invention

The present invention relates to image forming apparatus in an electrophotographic system such as a printer and a color photocopier.

2. Related Background Art

In recent years, it is desired for color image forming apparatus in an electrophotographic system such as a color printer and a color photocopier to provide output images with a high image quality. In particular, density gradation and stability thereof affects image quality levels much.

However, any changes in respective parts of apparatus due to environmental changes and long use will fluctuate image density of color image forming apparatus to be obtained. In particular in case of color image forming apparatus in an electrophotographic system, even a tiny environmental change might give rise to a density change to bring about color disbalance so it is necessary to have means for keeping a constant temperature. Therefore, a toner image for density detection (hereinafter referred to as patch) is configured to be made into an intermediate transfer member and a photosensitive member so as to detect the density of the pre-fixed toner patch with a pre-fixed toner density detecting sensor (hereinafter referred to as density sensor), feedback the detection results thereof to process conditions such as exposure quantities and developing bias to control density and thereby to obtain a stable image.

However, the density control with the density sensor is to form the patch onto an intermediate transfer member and a drum and the like to detect, and does not control changes in image color balance caused by performance changes in successive transfer onto the transfer member as well as in changes in the fixing nature. Density control with the density sensor cannot cope with these changes.

Therefore, a color image forming apparatus (hereafter referred to as color sensor) equipped on transfer material with a sensor to detect density or color of the patch on the transfer material has been proposed (for example, refer to Japanese Patent Application Laid-Open No. 2003-287934).

This color sensor is configured of three or more kinds of light sources with different emission spectrums such as red (R), green (G), blue (B) and the like as light emitting elements or by a light source emitting white (W) as light emitting element to form three or more kinds of filters with different spectral transmission factors of such as red (R), green (G), blue (B) and the like on a light-sensitive element. Thereby three or more different kinds of outputs such as R, G and B are obtained.

This color sensor is used to implement image density control (image gradation control) to realize more accurate density control.

However, the image forming apparatus described in the background of the invention is accompanied by the following defects.

In case of detecting toner image density (or chromaticity) on transfer material with the color sensor, the distance between the color sensor and the transfer material needs to be kept constant. The reason is that any change in distance between a color sensor and transfer material will generally vary detection output values to no small extent. That is, unstability in the distance between the color sensor and the transfer material will worsen detecting accuracy to disable good density control.

On the other hand, in order to stabilize the distance between the color sensor and the transfer material, the transfer material needs to be supported from the both front and rear surfaces, and when the supporting members (rollers, plate members and the like) for such a purpose contact the post-fixing toner image, gloss of that portion will vary compared with the other portions to constitute an image defect. In general, the contacting members rapidly cool and press the toner image in the portion where the supporting members are brought in contact and therefore gloss of that portion will get more intensive than in the other regions to constitute gloss unevenness with vertical streaks. In addition, in order to stabilize the transfer member posture, the contact pressure of the contact members should be made higher to some extent, that is, gloss unevenness is apt to occur than in case of sheet conveying member (a sheet discharging roller and the like) for transfer material discharge with comparatively light pressure setting. In addition, since, at the time of double-sided printing, a toner image exists in the rear surface of the transfer material as well, the transfer material supporting member brings about a similar defect.

That is, image forming apparatus equipped with a color sensor for detecting toner image density on transfer material used to give rise to a bad image called gloss unevenness.

SUMMARY OF THE INVENTION

An object of the present invention, which has been made under such a circumstance, is to prevent image forming apparatus using a color sensor from occurrence of gloss unevenness in a print image.

In order to achieve the object, in the present invention, image forming apparatus is configured as follows.

An image forming apparatus comprising: an image forming unit appropriate for forming images on recording material; an optical sensor appropriate for detecting light reflection characteristics of a visualized image formed on the recording material so as to control image density; a first regulating member structured integrally with said optical sensor and appropriate for contacting recording material front surface; and a second regulating member appropriate for contacting a recording material rear surface in a position opposing said first member; wherein at the time of normal printing, at least said first member is spaced apart from the transfer material front surface; and at the time of image density control, in order to keep distance between said optical sensor and said recording material front surface at a predetermined distance, said first regulating member is situated in contact with the recording material front surface and said second regulating member is situated in contact with the recording material rear surface.

An image forming apparatus comprising: an image forming unit appropriate for forming images on recording material; an optical sensor appropriate for detecting light reflection characteristics of a visualized image formed on the recording material so as to control image density; a first conveying path appropriate for conveying a recording sheet at the time of normal printing; and a second conveying path different from said first conveying path and appropriate for conveying a recording sheet at the time of image density control; wherein said optical sensor is provided in said second conveying path.

The present invention will enable simultaneous pursuit of stability in density detection and gloss unevenness in print images.

The other objects, configurations and effects of the present invention will become apparent from the following detailed descriptions as well as drawings.

DESCRIPTION OF THE PREFERRED EMBODIMENTS

The best mode for carrying out the present invention will be described in detail by way of embodiments.

Embodiment 1

The present Embodiment will describe a method for detecting with an optical sensor the light reflection characteristics of the post-fixing toner image formed on the transfer material so that, in the image forming apparatus with image density controlling means for controlling image forming conditions in accordance with the detecting results thereof and at the time of normal printing, the sensor contact member being integral with the optical sensor and the transfer material supporting member are disposed in a spaced position against the transfer material and at the time of image density control the sensor contact member moves in the direction of the transfer material supporting member to keep the distance between the transfer material and the optical sensor to a predetermined value, to, thereby, simultaneously pursue stability in density detection and gloss unevenness in print images.

Figure 1:
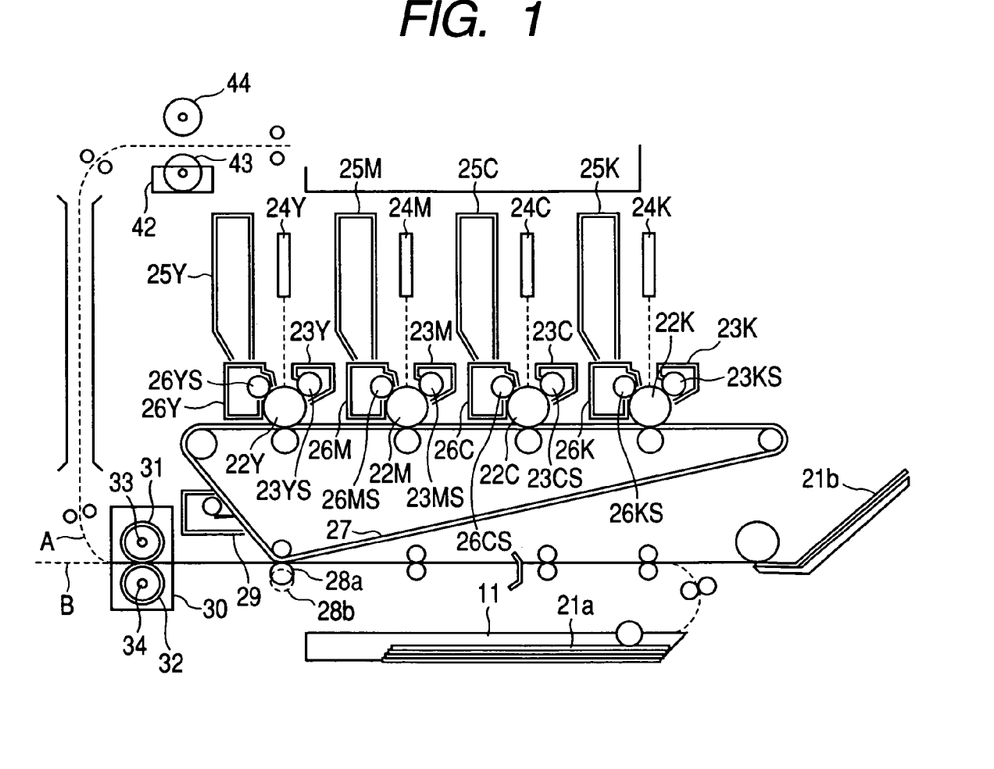
FIG. 1 is a sectional view showing a whole configuration of Embodiment 1.

FIG. 1 is a sectional view showing the whole configuration of color image forming apparatus in Embodiment 1. This apparatus is color image forming apparatus in a tandem system employing an intermediate transfer member 27 being an example of the color image forming apparatus in an electrophotographic system. The present color image forming apparatus is configured with an image forming portion shown in FIG. 1 and not-shown image processing portion.

As follows, with reference to FIG. 1, operation of the image forming portion in the color image forming apparatus in an electrophotographic system will be described. The image forming portion is to form an electrostatic latent image with exposing light made to illuminate based on an exposing period subject to conversion by the image processing portion, develop this electrostatic latent image to form monotint toner images, overlap these monotint toner images to form a multicolor toner image, transfer this multicolor toner image to a transfer material 11 as recording material and fix the multicolor toner image on that transfer material 11 and is configured by sheet feeding portion 21, photosensitive members (22Y, 22M, 22C and 22K) for respective stations disposed in parallel and assigned for each developing color, injecting charging means (23Y, 23M, 23C and 23K) as primary charging means, toner cartridges (25Y, 25M, 25C and 25K), developing means (26Y, 26M, 26C and 26K), an intermediate transfer member 27, transferring rollers 28, cleaning means 29, a fixing portion 30 and a color sensor 42.

The photosensitive drums (photosensitive members) 22Y, 22M, 22C and 22K are configured by coating the outer circumference of aluminum cylinders with an organic photoconductive layer and rotate by transmission of driving power of a not-shown driving motor, which rotates the photosensitive drums 22Y, 22M, 22C and 22K in the counterclockwise direction in accordance with image forming operations.

The primary charging means are configured to comprise four injecting charging devices 23Y, 23M, 23C and 23K for charging the photosensitive members of yellow (Y), magenta (M), cyanogens (C) and black (K) at respective stations and injecting charging devices are provided with sleeves 23YS, 23MS, 23CS and 23KS respectively.

The exposing light to the photosensitive drums 22Y, 22M, 22C and 22K is provided from the scanner portions 24Y, 24M, 24C and 24K so as to selectively expose the surfaces of the photosensitive drums 22Y, 22M, 22C and 22K and thereby to form a electrostatic latent image.

The developing means are configured to comprise four developing devices (26Y, 26M, 26C and 26K) for developing yellow (Y), magenta (M), cyanogens (C) and black (K) at respective stations in order to visualize the electrostatic latent image and the developing devices are provided with sleeves 26YS, 26MS, 26CS and 26KS respectively. Each developing device is installed in a detachably attachable fashion.

The intermediate transfer member 27 in contact with the photosensitive drums 22Y, 22M, 22C and 22K, and rotates in the clockwise direction at the time of color image forming so as to rotate in accordance with rotation of the photosensitive drums (22Y, 22M, 22C and 22K) to transfer a monotint toner image. Thereafter, a transferring rollers 28 to be described later is brought into contact with the intermediate transfer member 27 to nip and convey the transfer material 11 so as to transfer a multicolor toner image on the intermediate transfer member 27.

The transferring rollers 28 are brought into contact with the transfer material 11 in the position 28a while the multicolor toner image is being transferred on the transfer material 11 and is disposed in a space in the position 28b after printing treatment.

The fixing portion 30, which is to bring the transferred multicolor toner image into fusion fixing while conveying the transfer material 11, comprises as shown in FIG. 1 a fixing roller 31 for heating the transfer material 11 and the pressing roller 32 for bringing the transfer material 11 into pressure contact. The fixing roller 31 and the pressing roller 32 are formed as hollow cylinders and built-in heaters 33 and 34 are respectively installed inside. That is, the transfer material 11 retaining a multicolor toner image is conveyed by the fixing roller 31 and the pressing roller 32, and subject to application of heat and pressure the toner is fixed on the surface thereof. As described so far, a visualized image is formed on the transfer material 11.

The transfer material 11 subject to toner image fixing is afterwards discharged with a not-shown discharging roller to a not-shown discharging tray to end the image forming operation.

The cleaning means 29 is to clean the residual toner on the intermediate transfer member 27, the waste toner subject to transferring the four-color multicolor toner image formed on the intermediate transfer member 27 to the transfer material 11 is stored in a cleaner container.

The color sensor 42 as an optical sensor is disposed, in the color image forming apparatus in FIG. 1, downstream further than the fixing portion 30 of the transfer material conveying route in the direction of the image forming surface of the transfer material 11 so as to detect the toner image density value after fixing formed on the transfer material 11. Incidentally, the image forming apparatus of the present Embodiment is provided, as transfer material discharging paths, with a face-down discharging path indicated with a dotted line A and a face-up discharging path indicated with a dotted line B, and at the time when the color sensor 42 is used to implement image density control, the face-down discharging path of A is used. The color sensor 42 is disposed just anterior to the discharging port.

Figure 2:
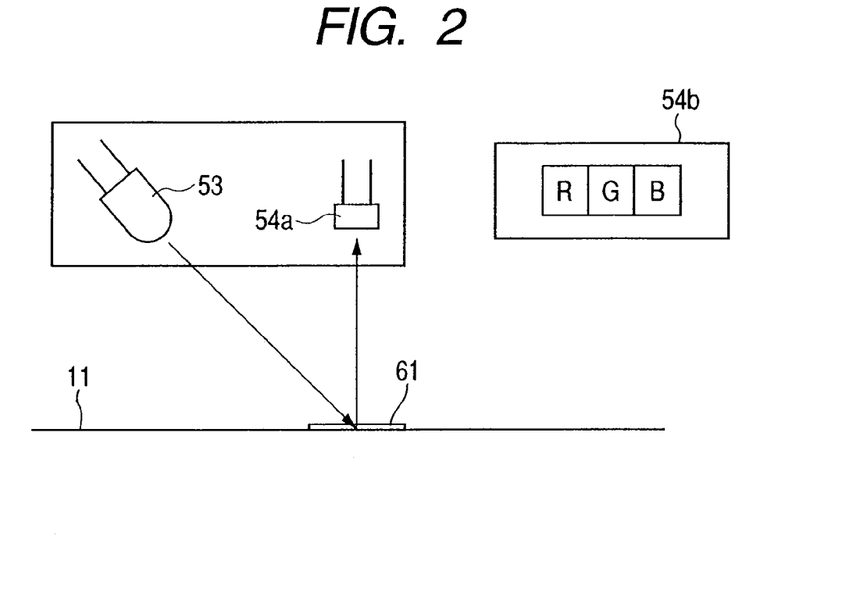
FIG. 2 is a diagram showing a configuration of the color sensor 42.

FIG. 2 shows an example of configuration of the color sensor 42. The color sensor 42 is configured with a white LED 53 and a charge storing type sensor 54a with an RGB onchip filter. The white LED 53 is caused to emit incident angle of 45 degrees askew to the transfer material 11 where a patch 61 has been formed subject to fixing and the diffused light intensity to the zero degree direction is detected with the charge storing type sensor 54a with an RGB onchip filter. The light-sensitive portion of the charge storing type sensor 54a with an RGB on-chip filter is configured to comprise pixels 54b with independent RGB.

The charge storing type sensor 54 with an RGB onchip filter may be a photo diode. As concerns the set of RGB three pixels, a few sets may be arranged. In addition, configuration of the incident angle and the reflecting angle may be 0 degree and 45 degrees respectively. Moreover, the RGB three colors may be configured with an illuminating LED and a filterless sensor.

Next, image density control in the present Embodiment will be described with reference to the flowchart in FIG. 3.

Incidentally, image density control of the present Embodiment is image gradation correction control with the color sensor 42.

This image density control is implemented at the time of ON-switching of the main body and at the time of replacement of the developing apparatus and the photosensitive member, when image density change is presumed to occur. In addition, the image density control, which would be desired by a user, shall be implemented manually by the user.

Step 1

A patch pattern is formed on transfer material.

Figure 4:
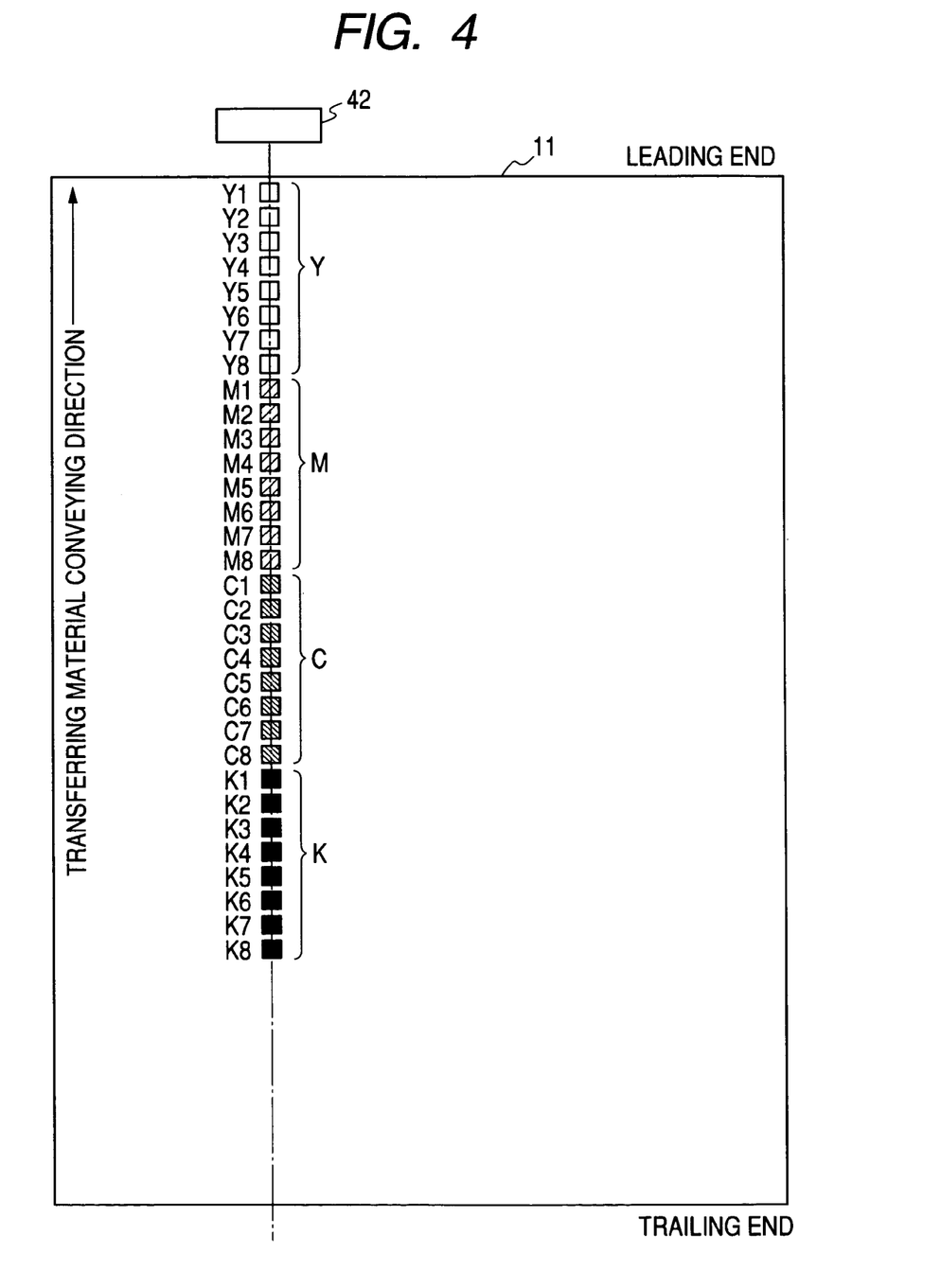
FIG. 4 is an arrangement diagram of patch patterns on the transfer material.

FIG. 4 shows a patch pattern formed on the transfer material 11 (in the present Embodiment, in A3 size of 297 mm×420 mm in the longitudinal direction) and 32 square patches of 8-mm size are formed in every 10 mm in the portion where the color sensor 42 is disposed, the 32 patches being made to change into eight levels of image printing rate (density gradation level) for each of Y, M, C and K (with eight patches for each color). Respective patches are set to correspond with printing rates (gradation level) of Y1, M1, C1 and K1=12.5%, Y2, M2, C2 and K2=25%, Y3, M3, C3 and K3=37.5%, Y4, M4, C4 and K4=50%, Y5, M5, C5 and K5=62.5%, Y6, M6, C6 and K6=75%, Y7, M7, C7 and K7=87.5% and Y8, M8, C8 and K8=100%.

Step 2

Density of the toner patches fixed on the transfer material is detected with the color sensor 42. Incidentally, a method for converting detection signals of the color sensor into density is a scheme involving a known detection-signal-to-density conversion table (density conversion table) in prior arts.

Step 3

Image gradation control (gradation correction) is implemented. As follows, image gradation control (gradation correction) will be described with FIG. 5. Incidentally, here, only gradation correction on the cyanogens color will be described, and as concerns magenta, yellow and black the similar method will be implemented for correction.

Figure 5:
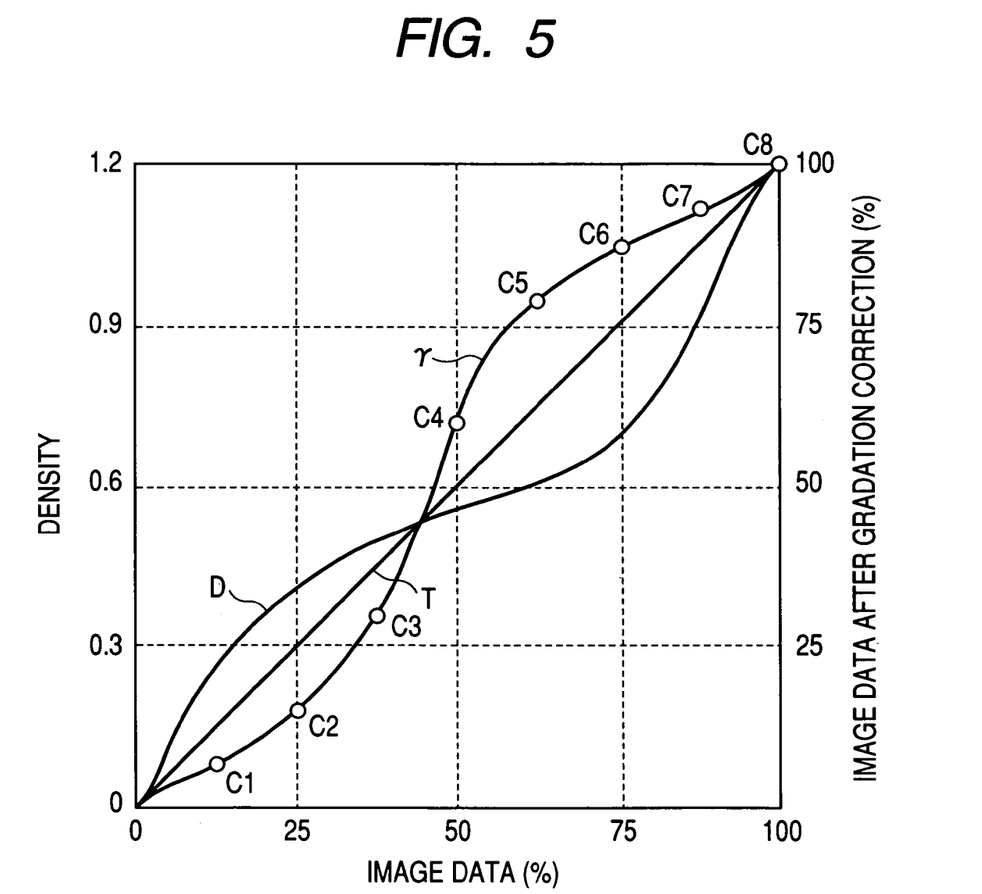
FIG. 5 is a graph describing the image gradation control method.

In FIG. 5, the abscissa axis indicates image data. In addition, the vertical axis indicates density detection value of the color sensor 42.

In addition, circles in the graph indicate the color sensor output density value for patches respectively of C1, C2, C3, C4, C5, C6, C7 and C8. Next, the direct line T represents the target density gradation characteristics of image density control. In the present invention, the target density gradation characteristics T is determined so as to constitute a proportional relationship between image data and density. The curve γ represents density gradation characteristics under the state where no density control (gradation correction control) has been implemented. Incidentally, gradation density without any patches having been formed is calculated subject to a spline interpolation so as to trace the coordinate origin as well as C1, C2, C3, C4, C5, C6, C7 and C8.

The curve D represents the gradation correction table calculated in the present control and is calculated by getting symmetrical points to the target gradation characteristics T of the pre-correction gradation characteristics γ. Incidentally, calculation of the gradation correction table D is executed with not-shown main body CPU and moreover the calculated gradation correction table D is stored in the main body memory (not shown) (a nonvolatile memory in the present Embodiment).

At the time of forming a print image, the image data are corrected with the gradation correction table D to obtain the target gradation characteristics.

Figure 3:
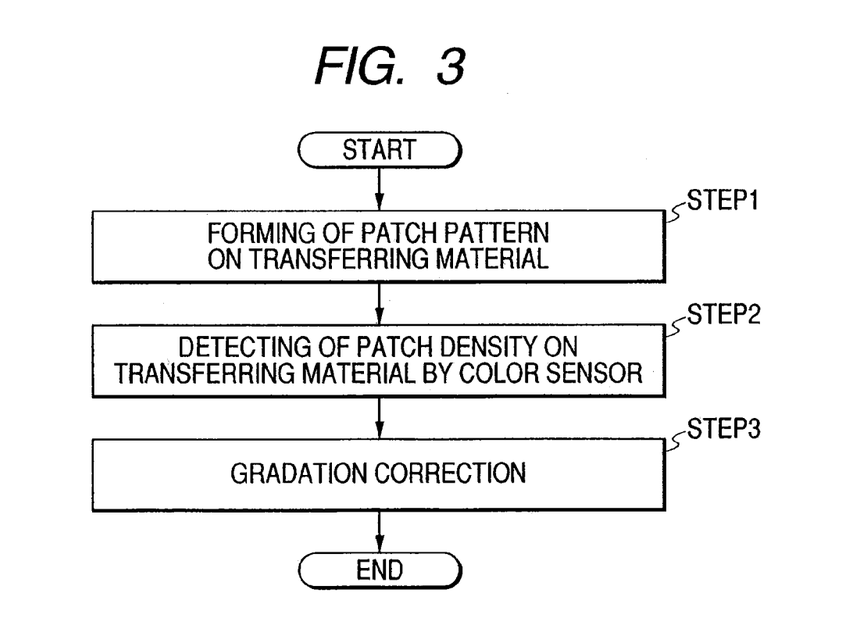
FIG. 3 is a flowchart describing image density control.

The flow chart of FIG. 3 described so far is executed with a not-shown controller.

The foregoing describes image gradation control (image gradation correction control) in the present Embodiment.

Next, a method for regulating the transfer material at the time of image density control, being characteristics of the present Embodiment, will be described with FIGS. 6A to 6C.

Figure 6A:
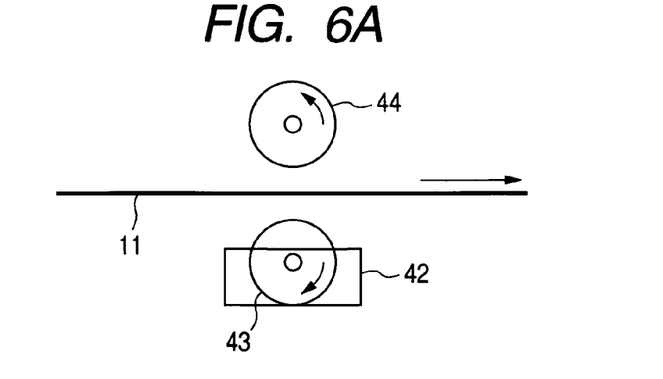
FIGS. 6A, 6B and 6C are diagrams describing the transfer material conveying method in Embodiment 1.
Figure 6B:
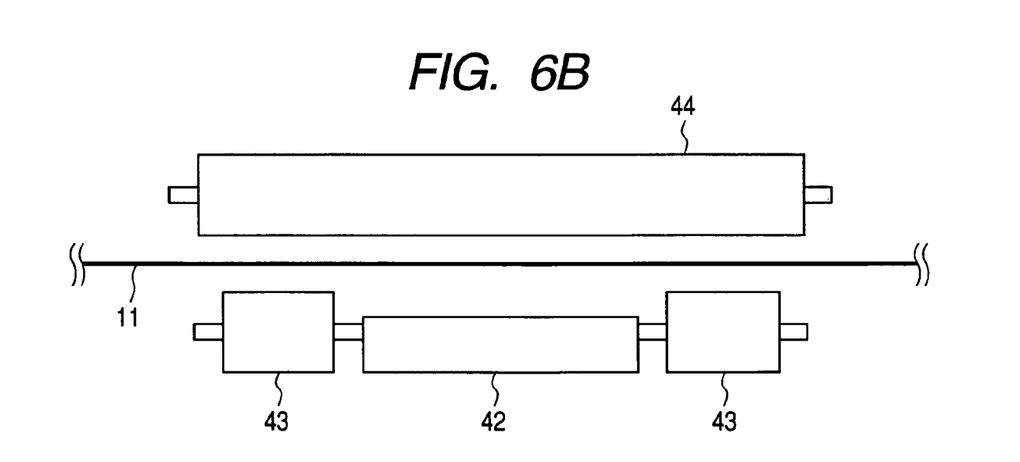

Among FIGS. 6A to 6C, FIG. 6A shows a positional relationship among the transfer material, the color sensor and a transfer material regulating member at the time of normal printing.

In the drawing, the transfer material front surface regulating roller 43 is structured to be movable in the transfer material direction with not-shown driving means in an integral fashion with the color sensor 42. In addition, incidentally, the transfer material front surface regulating roller 43 (first regulating member) rotates in the direction of the arrow at a process speed (transfer material conveying speed) with not-shown driving means. The transfer material rear surface regulating roller 44 (second regulating member) rotates in the direction of the arrow at a process speed (transfer material conveying speed) with not-shown driving means. Incidentally, at the time of normal printing, the transfer material front surface regulating roller 43 and the transfer material rear surface regulating roller 44 disposed in a spaced position under noncontact state against the transfer material 11 so that there exist no concerns about occurrence of gloss unevenness in the image on the transfer material. In FIGS. 6A to 6C, FIG. 6B is a view taken in FIG. 6A from a downstream position in the transfer material conveying direction (the direction of the arrow in FIG. 6A).

Figure 6C:
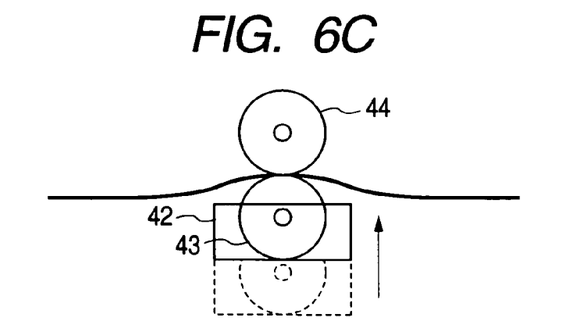

Next, in FIGS. 6A to 6C, FIG. 6C shows a positional relationship among the transfer material, the color sensor and a transfer material regulating member at the time of image density control.

As described above, in order to implement good density detection at the time of image density control, the distance between the transfer material and the color sensor 42 need to be kept constant. In the present Embodiment, the transfer material front surface regulating roller 43 moves to the position to be brought in contact with the transfer material rear surface regulating roller 44 (moves from the position indicated with dashed lines at the time of normal printing to the position indicated with full lines) so as to nip the transfer material 11 to thereby regulate the conveying position. Incidentally, since the transfer material front surface regulating roller 43 and the color sensor 42 are integral portions, the distance between the color sensor 42 and the transfer material 11 can be stabilized to a predetermined value. Accordingly, good density detection can be realized.

So far, the present Embodiment has described a method for detecting with an optical sensor the light reflection characteristics of the post-fixing toner image formed on the transfer material so that, in the image forming apparatus with image density controlling means for controlling image forming conditions in accordance with the detecting results thereof and at the time of normal printing, the sensor contact member being integral with the optical sensor and the transfer material supporting member are disposed in a spaced position against the transfer material and at the time of image density control the sensor contact member moves in the direction of the transfer material supporting member to keep the distance between the transfer material and the optical sensor to a predetermined value, to, thereby, simultaneously pursue stability in density detection and gloss unevenness in print images.

Embodiment 2

The present Embodiment will describe a method for detecting with an optical sensor the light reflection characteristics of the post-fixing toner image formed on the transfer material so that, in the image forming apparatus with image density controlling means for controlling image forming conditions in accordance with the detecting results thereof and at the time of normal printing, the transfer material front surface regulating roller 43 and the transfer material rear surface regulating roller 44 being integral with the optical sensor are disposed in a spaced position against the transfer material and at the time of image density control the transfer material rear surface regulating roller 44 moves in the direction of the transfer material regulating roller 43 to keep the distance between the transfer material and the optical sensor to a predetermined value, to, thereby, simultaneously pursue stability in density detection and gloss unevenness in print images.

Incidentally, the whole configuration of color image forming apparatus to be used in the present Embodiment and the method for image density control are similar to those in the image forming apparatus having been described in Embodiment 1 and descriptions will be omitted.

As follows, a method for regulating the transfer material at the time of image density control, being characteristics of the present Embodiment, will be described with FIGS. 7A and 7B.

Figure 7A:
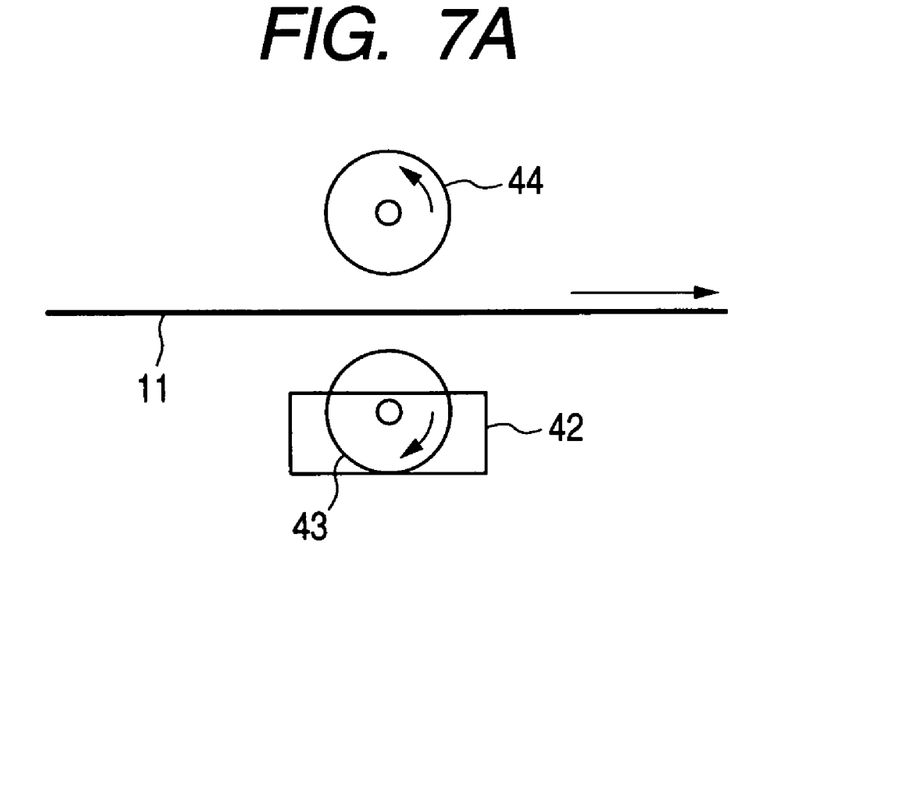
FIGS. 7A and 7B are diagrams describing the transfer material conveying method in Embodiment 2.

In FIGS. 7A and 7B, FIG. 7A shows a positional relationship among the transfer material, the color sensor and a transfer material regulating member at the time of normal printing.

The transfer material front surface regulating roller 43 (first regulating member) is structured integrally with the color sensor 42. In addition, incidentally, the transfer material front surface regulating roller 43 rotates in the direction of the arrow at a process speed (transfer material conveying speed) with not-shown driving means. The transfer material rear surface regulating roller 44 (second regulating member) rotates in the direction of the arrow at a process speed (transfer material conveying speed) with not-shown driving means. Moreover, it is structured to be movable in the transfer material direction with not-shown driving means. Incidentally, at the time of normal printing, the transfer material front surface regulating roller 43 and the transfer material rear surface regulating roller 44 are disposed in a spaced position under noncontact state against the transfer material 11 so that there exist no concerns about occurrence of gloss unevenness in the image on the transfer material.

Figure 7B:
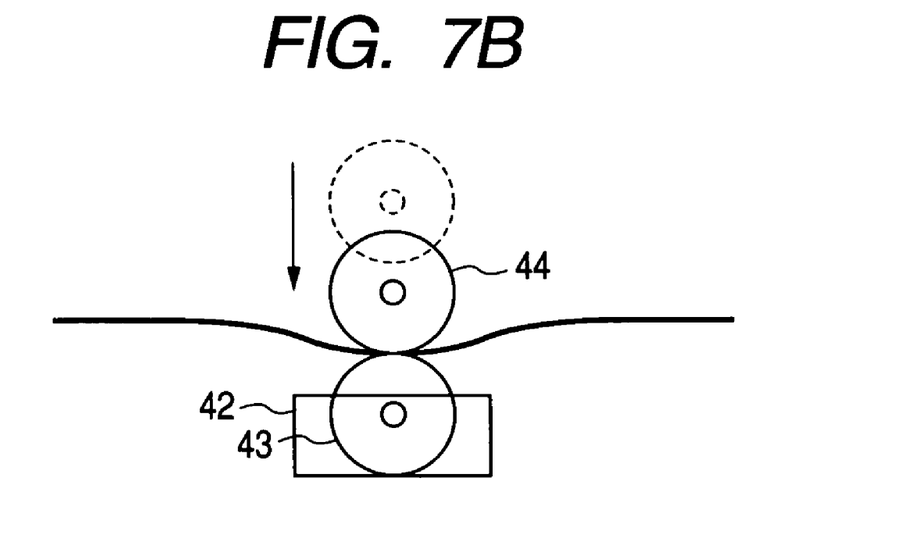

Next, in FIGS. 7A and 7B, FIG. 7B shows a positional relationship among the transfer material, the color sensor and a transfer material regulating member at the time of image density control.

As described above, in order to implement good density detection at the time of image density control, the distance between the transfer material and the color sensor 42 need to be kept constant. In the present Embodiment, the transfer material rear surface regulating roller 44 moves to the position to be brought in contact with the transfer material front surface regulating roller 43 (moves from the position indicated with dashed lines at the time of normal printing to the position indicated with full lines) so as to nip the transfer material 11 to thereby regulate the conveying position. Incidentally, since the transfer material front surface regulating roller 43 and the color sensor 42 are integral portions, the distance between the color sensor 42 and the transfer material 11 can be stabilized to a predetermined value. Accordingly, good density detection can be realized.

So far, the present Embodiment has described a method for detecting with an optical sensor the light reflection characteristics of the post-fixing toner image formed on the transfer material so that, in the image forming apparatus with image density controlling means for controlling image forming conditions in accordance with the detecting results thereof and at the time of normal printing, the sensor contact member being integral with the optical sensor and the transfer material supporting member are disposed in a spaced position against the transfer material and at the time of image density control the transfer material supporting member moves in the direction of the sensor contact member to keep the distance between the transfer material and the optical sensor to a predetermined value, to, thereby, simultaneously pursue stability in density detection and gloss unevenness in print images.

Embodiment 3

The present Embodiment will describe a method for detecting with an optical sensor the light reflection characteristics of the post-fixing toner image formed on the transfer material so that, in the image forming apparatus with image density controlling means for controlling image forming conditions in accordance with the detecting results thereof and at the time of normal printing, the transfer material front surface regulating roller 43 and the transfer material rear surface regulating roller 44 being integral with the optical sensor are disposed in a spaced position against the transfer material and at the time of image density control the transfer material front surface regulating roller 43 moves in the direction of the transfer material rear surface regulating roller 44 and the transfer material rear surface regulating roller 44 moves in the direction of the transfer material front surface regulating roller 43 to keep the distance between the transfer material and the optical sensor to a predetermined value, to, thereby, simultaneously pursue stability in density detection and gloss unevenness in print images.

Incidentally, the whole configuration of color image forming apparatus to be used in the present Embodiment and the method for image density control are similar to those in the image forming apparatus having been described in Embodiment 1 and descriptions will be omitted.

As follows, a method for regulating the transfer material at the time of image density control, being characteristics of the present Embodiment, will be described with FIGS. 8A and 8B.

Figure 8A:
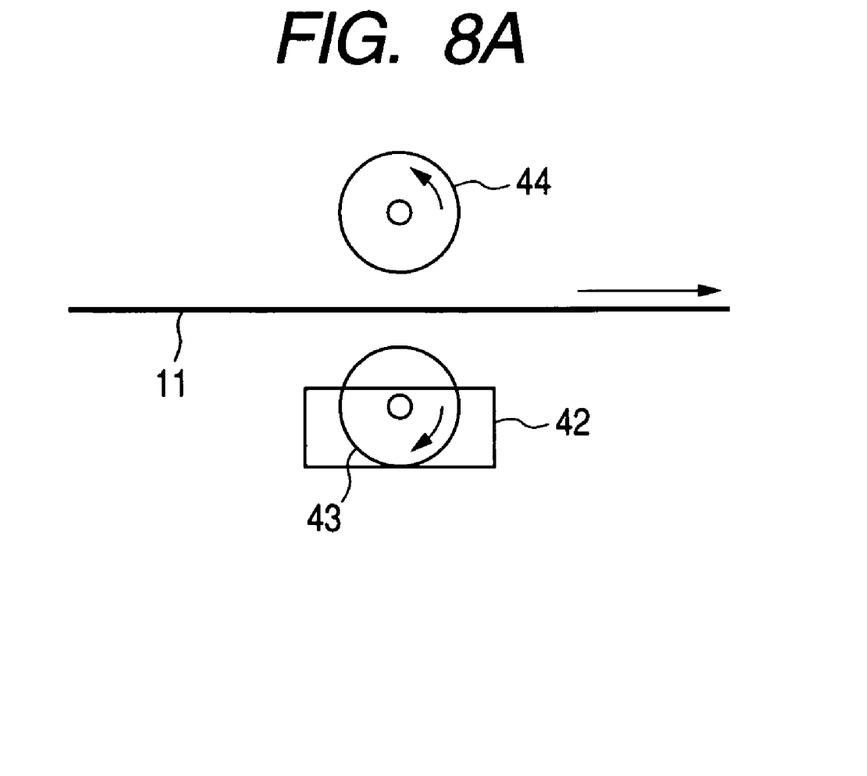
FIGS. 8A and 8B are diagrams describing the transfer material conveying method in Embodiment 3.

In FIGS. 8A and 8B, FIG. 8A shows a positional relationship among the transfer material, the color sensor and a transfer material regulating member at the time of normal printing.

The transfer material front surface regulating roller 43 (first regulating member) is structured integrally with the color sensor 42. In addition, incidentally, the transfer material front surface regulating roller 43 rotates in the direction of the arrow at a process speed (transfer material conveying speed) with not-shown driving means. In addition, incidentally, the transfer material rear surface regulating roller 44 (the second regulating member) rotates in the direction of the arrow at a process speed (transfer material conveying speed) with not-shown driving means. Moreover, the transfer material front surface regulating roller 43 and the transfer material rear surface regulating roller 44 are structured to be movable in the transfer material direction with not-shown driving means. Incidentally, at the time of normal printing, the transfer material front surface regulating roller 43 and the transfer material rear surface regulating roller 44 are disposed in a spaced position under noncontact state against the transfer material 11 so that there exist no concerns about occurrence of gloss unevenness in the image on the transfer material.

Figure 8B:
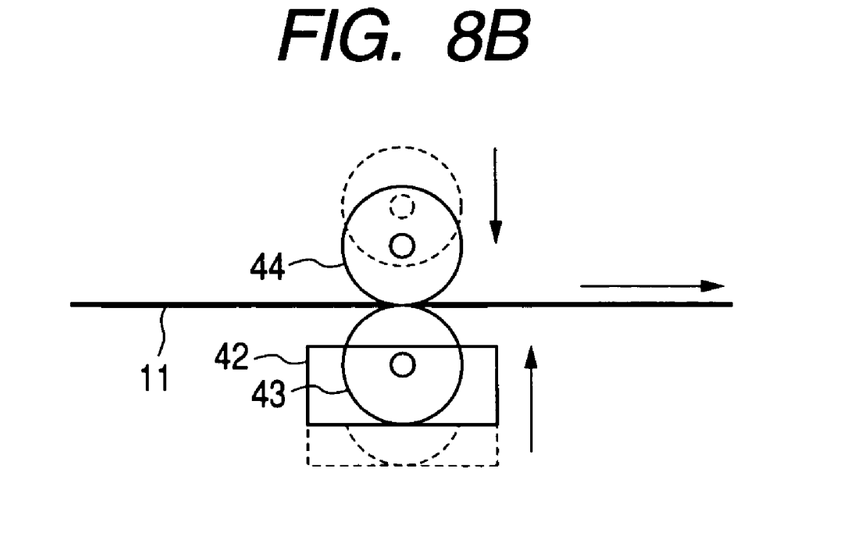

Next, in FIGS. 8A and 8B, FIG. 8B shows a positional relationship among the transfer material, the color sensor and a transfer material regulating member at the time of image density control.

As described above, in order to implement good density detection at the time of image density control, the distance between the transfer material and the color sensor 42 need to be kept constant. In the present Embodiment, the transfer material front surface regulating roller 43 and the transfer material rear surface regulating roller 44 move in the transfer material direction (move from the position indicated with dashed lines at the time of normal printing to the position indicated with full lines) so as to nip the transfer material 11 to thereby regulate the conveying position. Incidentally, since the transfer material front surface regulating roller 43 and the color sensor 42 are integral portions, the distance between the color sensor 42 and the transfer material 11 can be stabilized to a predetermined value. Accordingly, good density detection can be realized.

Incidentally, the conveying path of the transfer material 11 at the time of image density control being straight as at the time of normal image forming, the form of the present Embodiment is advantageously apt not to bring about jam and the like at the time of image density control.

So far, the present Embodiment has described a method for detecting with an optical sensor the light reflection characteristics of the post-fixing toner image formed on the transfer material so that, in the image forming apparatus with image density controlling means for controlling image forming conditions in accordance with the detecting results thereof and at the time of normal printing, the sensor contact member being integral with the optical sensor and the transfer material supporting member are disposed in a spaced position against the transfer material and at the time of image density control the sensor contact member and the transfer material supporting member move in the direction of the sensor contact member to keep the distance between the transfer material and the optical sensor to a predetermined value, to, thereby, simultaneously pursue stability in density detection and gloss unevenness in print images.

Embodiment 4

The present Embodiment will describe a method for detecting with an optical sensor the light reflection characteristics of the post-fixing toner image formed on the transfer material so that, in the image forming apparatus with image density controlling means for controlling image forming conditions in accordance with the detecting results thereof and a transfer material conveying path for the transfer material to be conveyed at the time of normal printing and a transfer material conveying path for the transfer material to be conveyed at the time of implementing image density control are respectively provided to, thereby, simultaneously pursue stability in density detection and gloss unevenness in print images.

Figure 9:
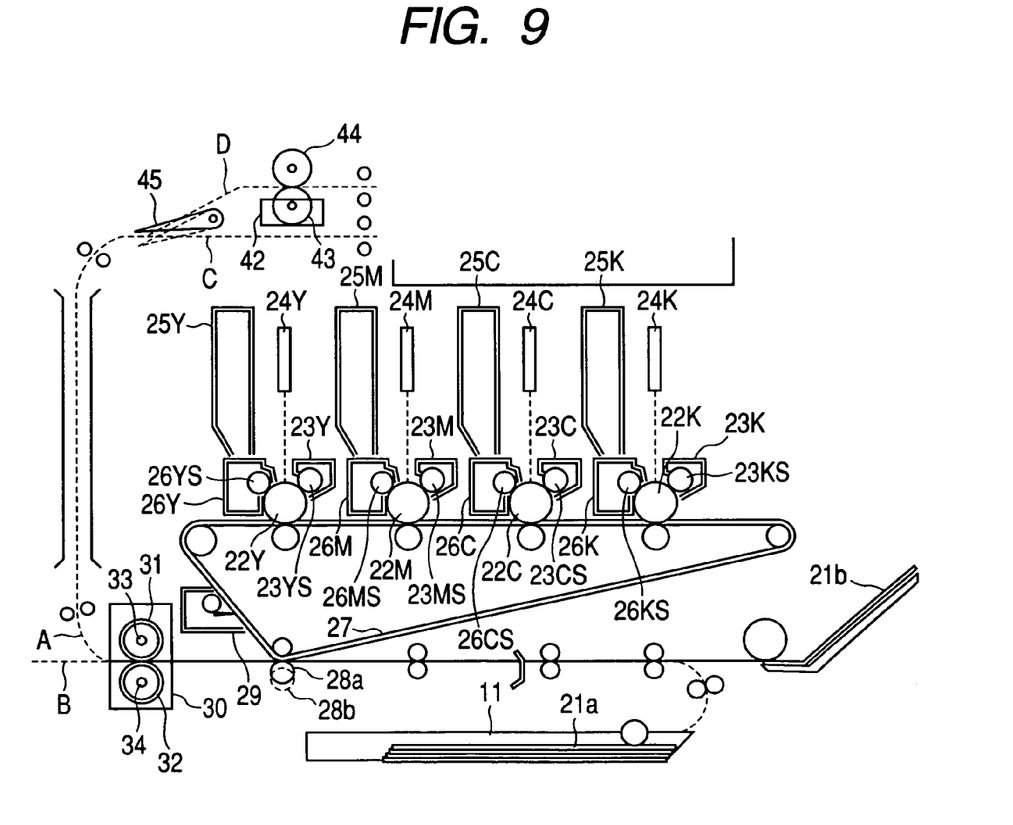
FIG. 9 is a view describing Embodiment 4.

FIG. 9 is a sectional view showing the whole configuration of image forming apparatus in Embodiment 4. Incidentally, the image forming portion to be used in the present Embodiment is similar to that in the image forming apparatus having been described in Embodiment 1 and descriptions will be omitted.

As follows, switching on the transfer material conveying paths, being characteristics of the present Embodiment, will be described.

At first, the image forming apparatus of the present Embodiment is provided, as transfer material discharging paths, with a face-down discharging path indicated with a dotted line A and a face-up discharging path indicated with a dotted line B, and at the time when the color sensor 42 is used to implement image density control, the face-down discharging path of A is used. Moreover, the face-down path A is divided into a transfer material conveying path C for the transfer material to be conveyed at the time of normal printing and a transfer material conveying path D for the transfer material to be conveyed at the time of implementing image density control. Switching between the transfer material conveying paths C and D is implemented with a flapper 45 driven with not-shown driving means.

At first, a method for conveying transfer material at the time of image density control will be described.

At the time of image density control, a flapper 45 is driven to the side of the dashed lines so that the transfer material conveying path D for the image density control is selected.

The color censor 42 is disposed midway in the direction of the image forming surface of the transfer material 11. Rotating at a process speed (transfer material conveying speed) in the direction of the arrow with not-shown driving means, the transfer material front surface regulating roller 43 and the transfer material rear surface regulating roller 44 nip the transfer material 11 to thereby regulate the conveying position. In addition, the transfer material front surface regulating roller 43 is structured integrally with the color sensor 42 to stabilize the distance between the color sensor 42 and the transfer material 11 to a predetermined value. Accordingly, good density detection can be realized.

Next, a method for conveying transfer material at the time of normal printing will be described.

At the time of normal printing, the flapper 45 is driven to the side of the full lines so that the transfer material conveying path C for the normal printing is selected. Since no rollers are disposed to strongly regulate the transfer material on the transfer material conveying path C, there exist no concerns about occurrence of gloss unevenness in the image on the transfer material.

So far, switching on the transfer material conveying paths in the present Embodiment has been described.

So far, the present Embodiment has described a method for detecting with an optical sensor the light reflection characteristics of the post-fixing toner image formed on the transfer material so that, in the image forming apparatus with image density controlling means for controlling image forming conditions in accordance with the detecting results thereof and a transfer material conveying path for the transfer material to be conveyed at the time of normal printing and a transfer material conveying path for the transfer material to be conveyed at the time of implementing image density control are respectively provided to, thereby, simultaneously pursue stability in density detection and gloss unevenness in print images.

Incidentally, in Embodiment 1 to Embodiment 4, such a form driven to rotate together with the transfer material front surface regulating roller 43 and the transfer material rear surface regulating roller 44 has been described as examples, but even such a form with only either one of the regulating rollers (either the transfer material front surface regulating roller 43 or the transfer material rear surface regulating roller 44) providing rotation drive to bring the other into driven rotation will do.

In addition, incidentally, in Embodiment 1 to Embodiment 4, as the supporting member for supporting the transfer material at the time of image density control, a roller-shaped supporting member was described as an example but the shape of the transfer material supporting member will not be limited thereto, and another form (for example, plate shape and the like) will do.

Moreover, in Embodiment 1 to Embodiment 4, as a method for image density control, image gradation control to adjust the density gradation characteristics of images was described as an example, but another method of image density control will do. For example, even such a method as to vary the developing bias value and the charging bias value to form a plurality of toner patches, to thereafter calculate the quantity of toner of those patches, to calculate the optimal developing bias value and the optimal charging bias value in accordance with those values and thereby to control density.

In addition, moreover, in the present Embodiment 1 to Embodiment 4, a case with density as the light reflection characteristics at the time when the color sensor has detected a toner patch, was described as an example, but the light reflection characteristics to be detected by the sensor is not limited thereto, and, for example, chromaticity or optical and, moreover the toner quantity calculated from optical reflection rate and the like may be used. That is, it goes without saying that any form comprising an optical sensor to detect physical quantities to undergo conversion based on the light reflection characteristics from the toner patch will fall within the application range of the present invention.

In addition, the above described Embodiments are to prevent gloss unevenness not only on the front surface but also on the rear surface of the transfer material, but basically, in case of image forming apparatus unable to form images on the rear surface, when the transfer material front surface regulating roller and the transfer material are spaced apart, the transfer material rear surface regulating roller and the transfer material do not always have to be spaced apart. That is, at least only the transfer material front surface regulating roller will do if it is spaced apart from the transfer material.

In addition, the above described Embodiments have described a configuration of using an electrophotographic system as image forming system to form images on transfer materials as a recording member, but images may be formed on the recording member directly with another image forming system such as an ink jet system and the like.

So far, the present invention has been described with several preferable Embodiments as examples, but the present invention will not be limited to those Embodiments and various variations and applications are obviously feasible within the range of Claims.

This application claims priority from Japanese Patent Application No. 2004-104450 filed on Mar. 31, 2004, which is hereby incorporated by reference herein.

What is claimed is:

1. An image forming apparatus comprising:
    an image forming unit that forms images on a recording material;
    an optical sensor that detects light reflection characteristics of a visualized image formed on the recording material so as to control image density;
    a first regulating member structured integrally with said optical sensor and that can contact a recording material front surface; and
    a second regulating member that contacts a recording material rear surface in a position opposing said first regulating member,
    wherein at the time of normal printing, at least said first regulating member is spaced apart from the recording material front surface, and
    at the time of image density control, in order to keep distance between said optical sensor and the recording material front surface at a predetermined distance, said first regulating member is situated in contact with the recording material front surface and said second regulating member is situated in contact with the recording material rear surface.

2. The image forming apparatus according to claim 1, wherein at the time of image density control, said first regulating member moves in the direction of said second regulating member so that said first regulating member contacts the recording material front surface and said second regulating member contacts the recording material rear surface.

3. The image forming apparatus according to claim 1, wherein at the time of image density control, said second regulating member moves in the direction of said first regulating member so that said first regulating member contacts the recording material front surface and said second regulating member contacts the recording material rear surface.

4. The image forming apparatus according to claim 1, wherein at the time of image density control, said first regulating member moves in the direction of said second regulating member and the second regulating member moves in the direction of said first regulating member so that said first regulating member contacts the recording material front surface and said second regulating member contacts the recording material rear surface.

5. The image forming apparatus according to claim 1, wherein at the time of normal printing, both of said first regulating member and said second regulating member are spaced apart from the recording material.

6. The image forming apparatus according to claim 1, wherein said image forming unit executes an electrophotographic process.

7. The image forming apparatus according to claim 6, wherein said image forming unit includes a fixing unit that fixes a toner image on the recording material, and said optical sensor detects light reflection characteristics of an image fixed by said fixing unit.

8. The image forming apparatus according to claim 1, further comprising a controller that controls density of each color component in accordance with detection results of said optical sensor to thereby control chromaticity of color images.

9. The image forming apparatus according to claim 1, further comprising:
a first conveying path that conveys a sheet of recording material at the time of normal printing; and
a second conveying path different from said first conveying path and that conveys a sheet of recording material at the time of image density control,
wherein said optical sensor is provided in said second conveying path.

10. The image forming apparatus according to claim 9, wherein said second conveying path is a conveying path for face-down discharge.

* * * * *

UNITED STATES PATENT AND TRADEMARK OFFICE
CERTIFICATE OF CORRECTION

PATENT NO. : 7,280,778 B2
APPLICATION NO. : 11/088756
DATED : October 9, 2007
INVENTOR(S) : Yoichiro Maebashi et al.

It is certified that error appears in the above-identified patent and that said Letters Patent is hereby corrected as shown below:

ON THE COVER PAGE:
    In item "(56) References Cited," under " FOREIGN PATENT DOCUMENTS," the first three listed documents, "JP    58031354 A *  2/1983
    JP    10268589 A *  10/1998
    JP   2000132013 A *  5/2000"

should read as follows:

-- JP    58-031354  A  *   2/1983
        JP    10-268589  A  *   10/1998
        JP   2000-132013  A  *   5/2000 --.

COLUMN 4:
    Line 15, "rotate by" should read -- and by rotating them --.
    Line 23, "cyanogens" should read -- cyan --.
    Line 33, "cyanogens" should read -- cyan --.
    Line 44, "a" should be deleted.
    Line 45, "is" should read -- are --.

COLUMN 6:
    Line 25, "is" should read -- are --.
    Line 50, "characteristics" should read -- characteristic --.

COLUMN 7:
    Line 15, "need" should read -- needs --.

UNITED STATES PATENT AND TRADEMARK OFFICE
CERTIFICATE OF CORRECTION

PATENT NO. : 7,280,778 B2
APPLICATION NO. : 11/088756
DATED : October 9, 2007
INVENTOR(S) : Yoichiro Maebashi et al.

It is certified that error appears in the above-identified patent and that said Letters Patent is hereby corrected as shown below:

<u>COLUMN 8:</u>
  Line 4, "characteristics" should read -- characteristic --.
  Line 34, "need" should read -- needs --.

<u>COLUMN 11:</u>
  Line 1, "censor" should read -- sensor --.

Signed and Sealed this

Twenty-sixth Day of August, 2008

JON W. DUDAS
*Director of the United States Patent and Trademark Office*